May 3, 1932.   J. V. BRETAUD   1,856,461
REAR AXLE ASSEMBLY FOR MOTOR TRUCKS
Filed Sept. 9, 1930   2 Sheets-Sheet 2

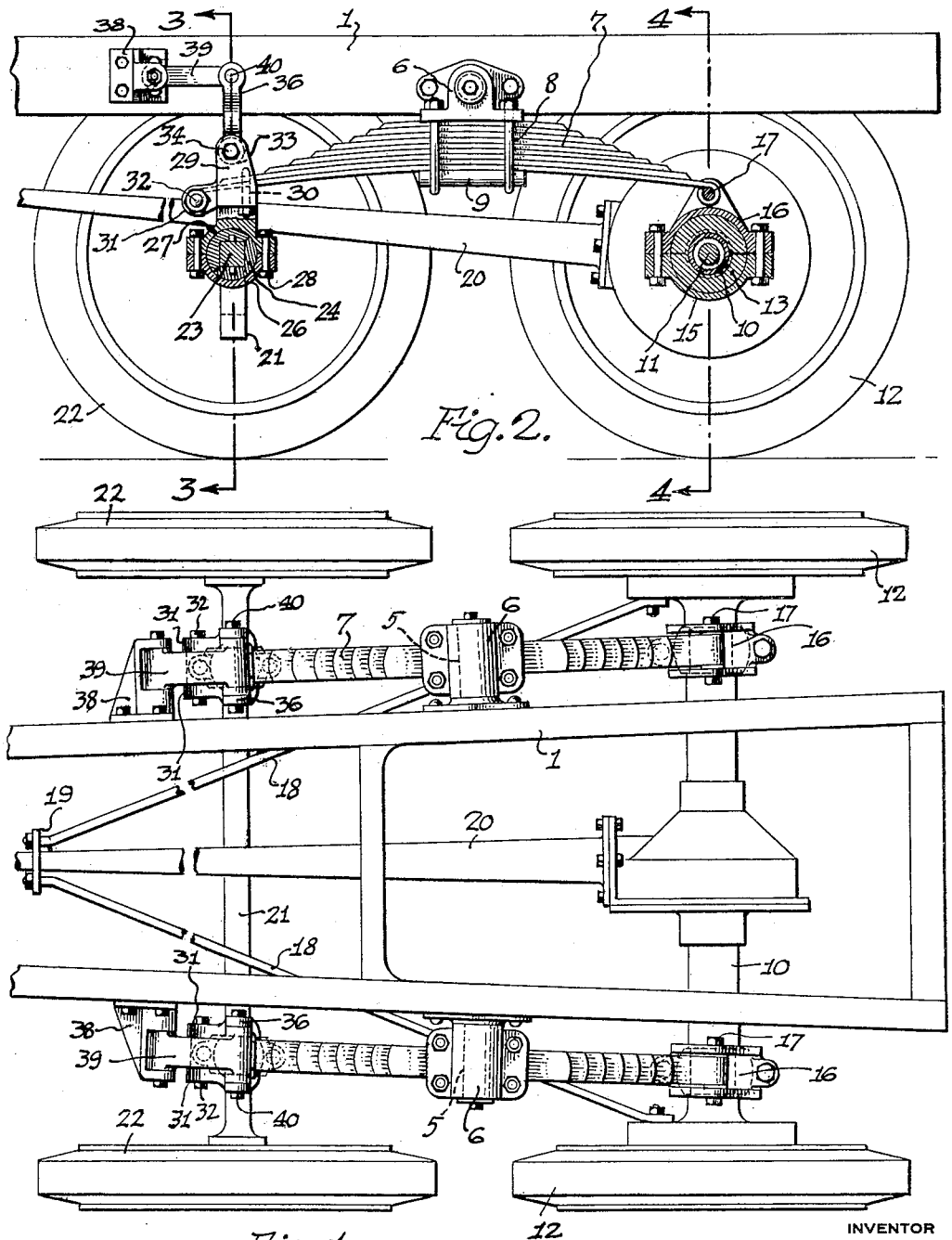

INVENTOR
Joseph V. Bretaud,
BY
ATTORNEYS

Patented May 3, 1932

1,856,461

UNITED STATES PATENT OFFICE

JOSEPH V. BRETAUD, OF DETROIT, MICHIGAN, ASSIGNOR TO SWEDISH CRUCIBLE STEEL COMPANY, OF DETROIT, MICHIGAN, A CORPORATION OF MICHIGAN

REAR AXLE ASSEMBLY FOR MOTOR TRUCKS

Application filed September 9, 1930. Serial No. 480,746.

The present invention pertains to a novel rear axle assembly for motor trucks, and the general object is to increase the carrying capacity of such trucks.

This object is accomplished generally by providing a four-wheel and double axle construction instead of a two-wheel and single axle construction, whereby the load is given another point of support and is therefore distributed more evenly over the road. Consequently, a load of any weight is better distributed, and the maximum load may be increased as regards the effect on the axles and road.

The invention further provides for a flexible mounting of the rear end of the body upon the two axles, whereby any one of the four rear wheels may move up or down in response to irregularities in the road surface without affecting the remaining wheels. Such displacement of the wheels and the axles is permitted by universal joints between the spring ends and the points of the axles on which they rest. In this connection it may also be noted that the auxiliary axle is mounted without the aid of the usual frame extensions.

The regular rear or driven axle is held against swaying with respect to the propeller shaft housing by means of torque or brace rods, and the auxiliary axle is retained against excessive shifting transversely of the vehicle by means of guide members extending therefrom to the body of the vehicle.

The invention is fully disclosed by way of example in the following description and in the accompanying drawings, in which—

Figure 1 is a plan view of the rear axle assembly;

Fig. 2 is a longitudinal section thereof;

Figure 3:
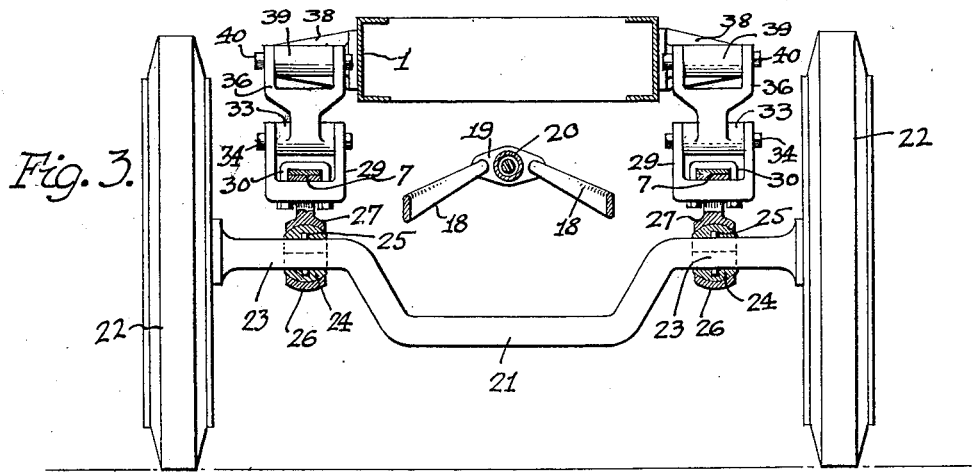
Figure 4:
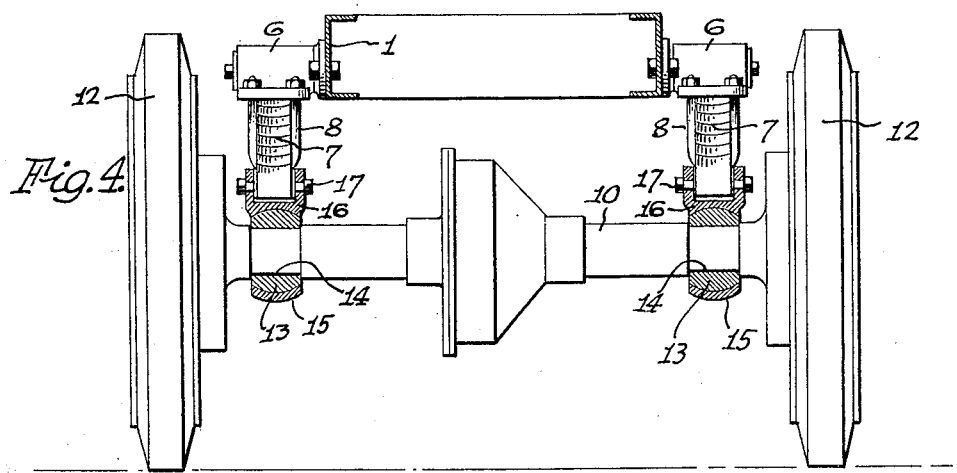
Figure 5:
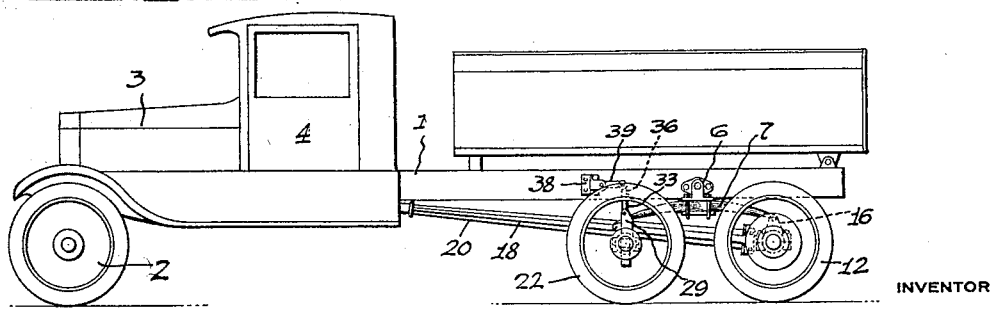

Figs. 3 and 4 are vertical sections on the lines 3—3 and 4—4 respectively of Figure 2; and Fig. 5 is a side elevation of a motor truck equipped according to the invention.

Reference to these views will now be made by use of like characters which are employed to designate corresponding parts throughout.

In Figure 5 is illustrated a conventional motor truck comprising a chassis or body member 1, the forward end of which is mounted on forward or steering wheels 2 and which in turn supports the usual motor 3 and cab 4. The invention, as already indicated, is directed more particularly to the rear axle construction.

According to the invention, the rear axle assembly is a four-wheel unit and converts the truck into the type known as a six-wheeler. Inasmuch as the spring and associated structure at each side of the body is identical, it will be necessary to describe only one side.

With reference to Figures 1 and 2, it will be seen that each side of the frame or body 1 has secured thereto a trunnion 5 near the rear end thereof. The trunnion serves to support a spring seat 6 in a pivotal manner. Against the seat and beneath the same is disposed the back or center of a semi-elliptic spring 7 which in turn is supported by U-clips 8 bolted in the seat 6. At the bottom of the spring, a separator 9 is held by the clips 8 and serves to hold them in spaced relation.

The rear axle housing 10 is illustrated in Figure 2 and encloses the rear axle 11 which in turn carries the rear wheels 12 in the usual manner. The rear axle is supported from the rear ends of the springs 7 and for this purpose is equipped at each end with a pair of ball sections 13 received in grooves 14 formed in the axle near the ends thereof as shown more clearly in Figure 4. The attachment to the springs is made by means of shell sections 15 and 16 bolted together over each ball structure to have a universal movement relative thereto, the upper section 16 carrying a transverse bolt 17 around which the rear end of the corresponding spring 7 is coiled as shown in Figure 2. Torque rods 18 extend forwardly from the ends of the rear axle housing to a suitable plate 19 mounted on the propeller shaft housing 20 for the usual purpose and also serve as a brace to prevent undue sway of the rear axle in a horizontal plane with respect to the propeller shaft housing 20.

In advance of the rear axle is positioned an auxiliary axle 21 carrying auxiliary wheels 22 similar to the wheels 12. At each end of the auxiliary axle, at a squared portion 23 thereof, is mounted a ball member 24 consisting of two like parts keyed as at 25 to the squared portion 23. Over each of these balls is mounted a shell member comprising a lower section 26 and an upper section 27 bolted together at 28, so that the entire shell is capable of universal movement with respect to the ball enclosed therein. The upper section however is also formed as a combined spring seat and shackle 29 of U-shape. In the U member is seated the front end of the corresponding spring 7, and this end is further secured to the member 29 by an inverted U bolt or clip 30 as shown more clearly in Figure 3. Furthermore, the extremity of the spring is held between ears 31 extending from the sides of the member 29, by means of a bolt 32, as shown in Figures 2 and 3.

Between the ears of the member 29 is pivotally mounted a shackle 33 on a bolt 34 extending transversely of the vehicle. To the side of the body 1 and at one side of the auxiliary axle 23 is firmly secured a bracket 38 to which is pivotally attached one end of a link 39 as clearly shown in Figures 1 and 2. The free end of the link is received between the arms 36 of the shackle 33 and pivotally joined thereto by a pin 40.

The function of the structure extending from the bracket 38 to the ball 24, apart from supporting the forward end of the spring 7, is to prevent excessive axial displacement of the auxiliary axle, for without some such connection from the auxiliary axle to the body, the axle would sway as far as permitted by the springs 7, particularly when the vehicle is moving rapidly over a rough or sloping road. Similar swaying of the rear or driven axle with respect to the propeller shaft housing is prevented by the torque rods 18.

The rear axle construction herein described provides complete flexibility in all respects. Either axle may be tilted in a vertical plane at either end and independently of the other axle in response to irregularities in the road surface. This action is permitted by the universal or ball and socket connection between each end of each spring and the point of the axle on which it rests.

Due to the central attachment of the semi-elliptic springs to the body 1, a vertical displacement of either axle on striking an irregularity in the road will displace the rear end of the body through only half the vertical distance as compared with a displacement through the entire distance in the case of a single rear axle.

The carrying capacity of the vehicle is increased because of the fact that the load is distributed over three axles rather than two axles, so that a better support for any given load is provided. The mounting of the auxiliary axle in advance of the rear axle does away with the frame extensions ordinarily used with such devices.

Although a specific embodiment of the invention has been illustrated and described, it will be understood that various alterations in the details of construction may be made without departing from the scope of the invention, as indicated by the appended claims.

What I claim is:

1. In a rear axle assembly, a body member, a semi-elliptic spring attached at its center to said body, a rear axle and an auxiliary axle having each a ball mounted thereon, spring seats mounted for universal movement on said balls and supporting the ends of said springs, a shackle extending from one of said spring seats, and another shackle having a pivotal connection to the first shackle and pivotally connected to said body.

2. In a rear axle assembly, a body member, a semielliptic spring attached at its center to said body, a driven rear axle and an auxiliary axle positioned in advance of said rear axle, having each a ball mounted thereon, spring seats mounted for universal movement on said balls and supporting the ends of said springs, a shackle extending from one of said spring seats, and another shackle having a pivotal connection to the first shackle and pivotally connected to said body.

3. In a rear axle assembly, a body member, a semi-elliptic spring attached at its center to said body, a rear axle having a ball connection to one end of said spring, an auxiliary axle having a ball connection to the other end of said spring, a link pivoted to said body, and a linkage extending from said link to one of said axles, said linkage being rigid transversely of said body member.

4. In a rear axle assembly, a body member, a semi-elliptic spring attached at its center to said body, a rear axle and an auxiliary axle having each a ball mounted thereon, spring seats mounted for universal movement on said balls and supporting the ends of said springs, a shackle extending from one of said spring seats, a link pivoted to said body, and another shackle having a pivotal connection to the first shackle and attached to said link.

In testimony whereof I affix my signature.

JOSEPH V. BRETAUD.